G. OWEN.
Seed-Planters.

No. 147,160. Patented Feb. 3, 1874.

Witnesses:
Sydney Brooks
Z. P. Dederick

Inventor.
George Owen.
Per. Z. P. Dederick.
Atty.

UNITED STATES PATENT OFFICE.

GEORGE OWEN, OF VICKSBURG, MISSISSIPPI.

IMPROVEMENT IN SEED-PLANTERS.

Specification forming part of Letters Patent No. 147,160, dated February 3, 1874; application filed September 10, 1873.

*To all whom it may concern:*

Be it known that I, GEORGE OWEN, of the city of Vicksburg, county of Warren and State of Mississippi, have invented a new and useful Improvement in Seed-Planters; and I do hereby declare that the following is a full, clear, and exact description thereof, which will enable others skilled in the art to make and use the same, reference being had to the accompanying drawing forming part of this specification.

Figure 1:
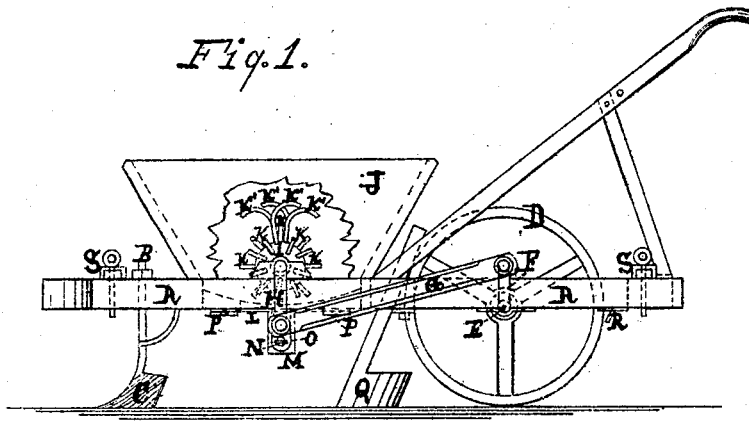
Figure 2:
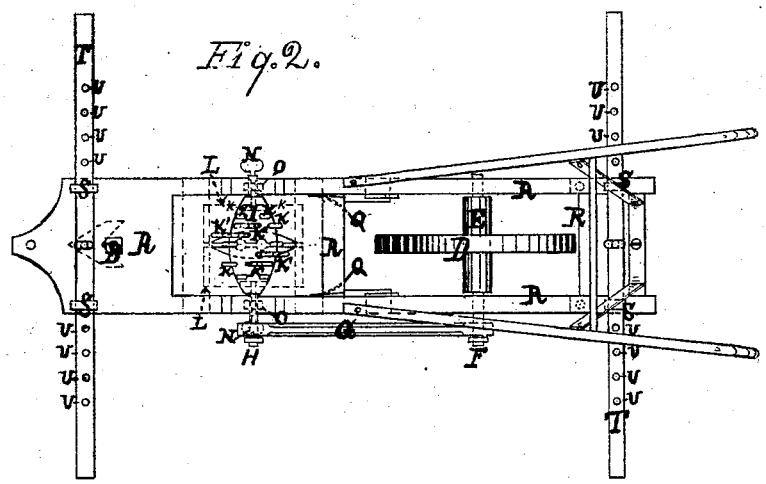

Figure 1 is a side elevation of my improved machine with a portion of the hopper broken away. Fig. 2 is a top view with the hopper entirely removed.

Similar letters of reference indicate corresponding parts.

My invention has for its object to furnish an improved machine for planting various kinds of seeds, and also for distributing guano or other fertilizer in drills, and which shall be simple in construction, effective and reliable in operation; and it consists in the construction and combination of the various parts of the machine, as hereinafter more fully described and claimed.

A is the frame of the machine, consisting of two long side bars connected by cross-bars at suitable distances apart. In the center of the forward cross-bar of the frame A is a hole, through which a chain may be passed to secure the draft attachment. The upper end of the standard B is also secured to the same cross-bar. To the lower end of said standard is attached the plow C for opening the furrow to receive the seed or fertilizer. D is the drive-wheel, which is rigidly attached to the middle part of the axle E, which revolves in bearings attached to the side bars of the frame A. To one end of the axle E is secured a crank, F, from which a connecting-rod, G, extends to crank H, which crank is about one-third longer than F. The crank H is secured to one end of the feed-shaft I, which passes transversely through the hopper J near its bottom, and has its bearings in the side pieces A of the frame. K K' are pins arranged around the feed-shaft I. It will be noticed that the four teeth marked K' are longer than those marked K, and they also have their upper ends bent in opposite directions. With this arrangement, when the machine is in use, all the seed or contents of the hopper are kept constantly stirred up, and said contents are thus prevented from bridging over. The bottom of the hopper J is dished, as shown, and in the center is an opening ten or twelve inches long by about three wide. The quantity of seed or fertilizer discharged from the hopper is regulated by the plates L. Said plates are provided with projecting ears M, through which the thumb-screws N pass, and are riveted over upon the inside to prevent their pulling out. A thread is cut the whole length of these screws, which fits into the pieces O that are securely fastened to the side pieces of the frame A. By turning the screws it will be seen that the plates L move freely in the slides P, thus regulating the quantity of seed discharged from the hopper. Q Q are the coverers, consisting of two mold-plows, turning right and left toward the center of the row, and secured to the side pieces A of the frame in such a manner as to follow after the dropper and cover up the seeds. The principal part of the weight of the back part of the machine rests upon the wheel D, which runs over the row and gently packs the soil around the seed. The scraper R prevents any great amount of dirt from accumulating upon the periphery of wheel D. To the frame A, near each end, are firmly secured staples S, through which may be passed the bars T that are provided with holes U. These bars, as will be seen, are not of any service when a single machine is used, but are intended chiefly to connect two together when it is desired to sow in more than one row. This is accomplished by withdrawing the pins V and sliding the bars to one side and through corresponding staples on the other machine.

Having thus described my invention, I claim as new and desire to secure by Letters Patent—

In a seed-planter, the feed-shaft I provided with short teeth K and long teeth K' on top, bent over at the upper end in the form of a quarter of a circle, two of which turn in one direction and two in an opposite direction, and the said shaft being provided with suitable rocking mechanism, as herein shown and for the purpose specified.

GEORGE OWEN.

Witnesses:
SYDNEY BROOKS,
Z. P. DEDERICK.